Figure 1:
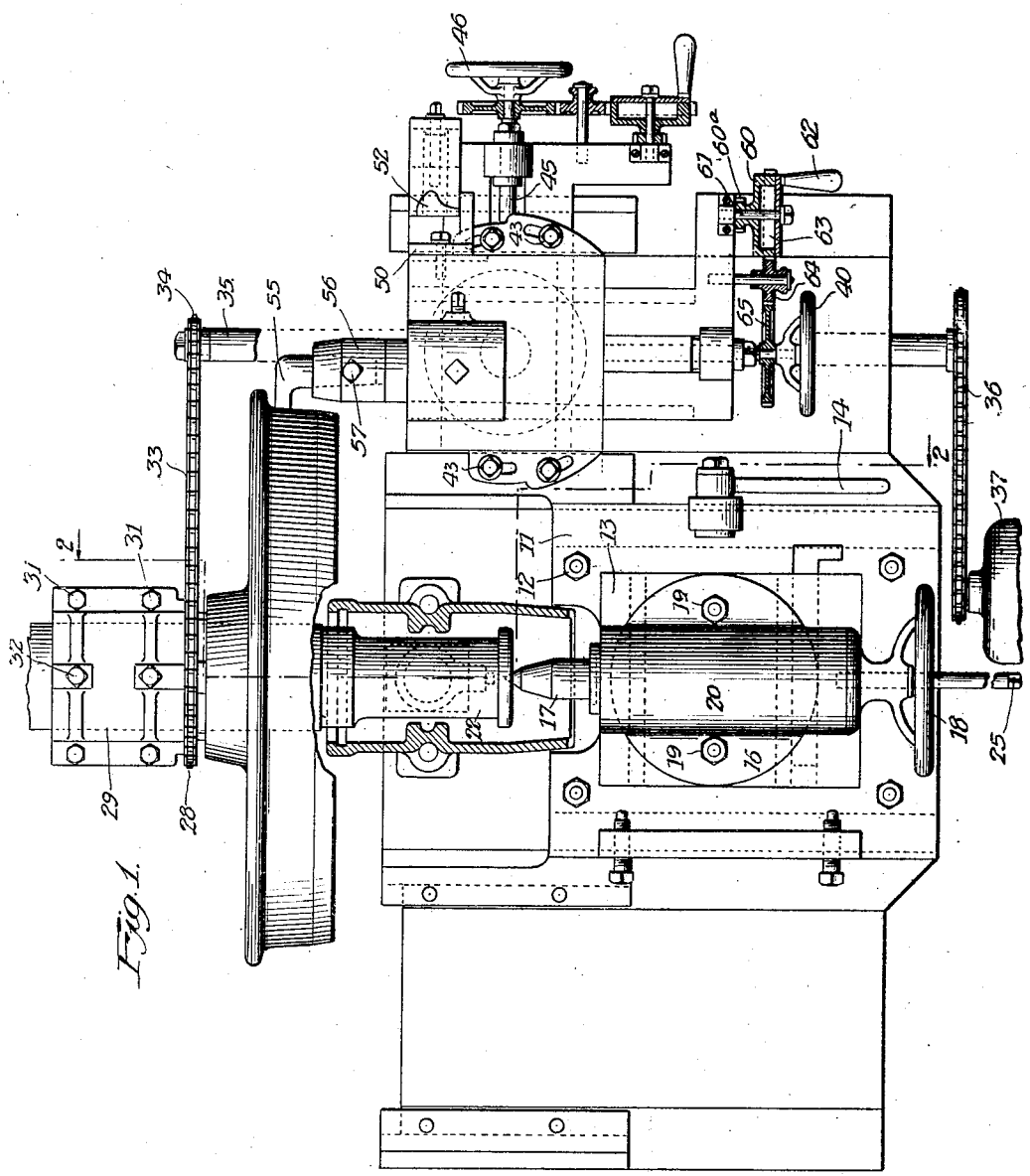

May 10, 1932.  C. P. KIMMEL  1,857,457
WHEEL TREAD REFACER
Filed May 5, 1930  2 Sheets-Sheet 1

Witness
R B Davison

Inventor
Charles P. Kimmel
By Murray & Murray
Attys

May 10, 1932.   C. P. KIMMEL   1,857,457
WHEEL TREAD REFACER
Filed May 5, 1930   2 Sheets-Sheet 2
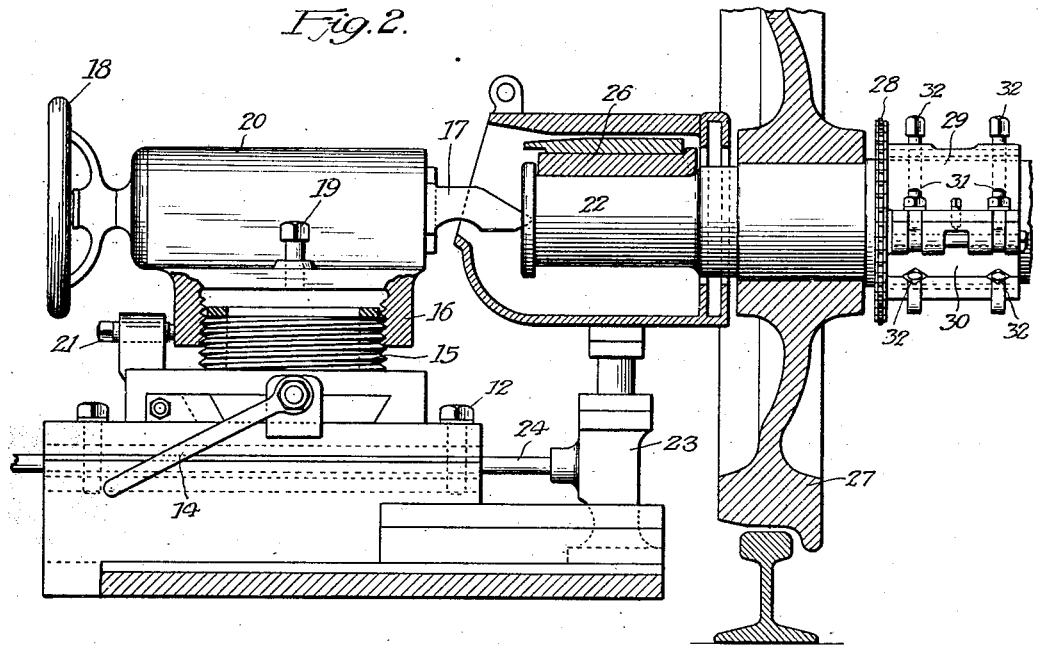
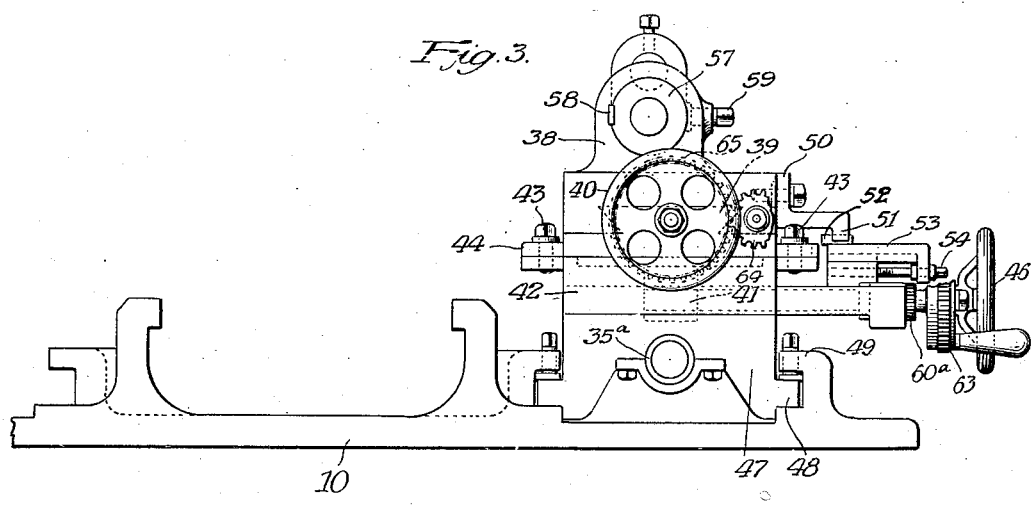
Inventor
Charles P. Kimmel
By Murray & Murray
Attys.
Witness
R. B. Davison Patented May 10, 1932

1,857,457

UNITED STATES PATENT OFFICE

CHARLES P. KIMMEL, OF GARY, INDIANA

WHEEL TREAD REFACER

Application filed May 5, 1930. Serial No. 449,881.

My invention relates to means for refacing the treads of car wheels and particularly to mechanism adapted to operate on car wheels without removing them from the truck, and without removing the truck from beneath the car.

It is well known that railway car wheels become worn in service and develop defects such as flat spots, shelling, thin flanges, etc., and the upkeep of the cars requires frequent removal of the wheels for refacing. The common practice is to remove the wheels and axle transfer them to a shop, install them in a special lathe and reform the treads and flanges. However, this involves considerable expense not only of labor in removing or replacing the wheels and axle, but in loss of service of the cars.

My invention relates to a mechanism so designed that the wheels may be refaced, either by turning or grinding, without removing them from their association with the truck. This involves a lifting of the weight of the car which is normally transmitted to the axle through the journal box, then centering the axle and slightly raising the wheels from contact with the track. By the application of a simple gear or sprocket to the axle, means are provided for connecting it to a motor whereby the wheels may be rotated. A cutting tool is then applied to the tread and flange of the wheel in accordance with a gauge of the proper contour.

The invention will be more readily understood by reference to the accompanying drawings, in which Fig. 1 is a plan view of mechanism arranged in accordance with my invention;

Fig. 2 is a side elevation partly in section, the view being taken substantially on the line 2—2 of Fig. 1; and Fig. 3 is an end view of the tool holding and feeding mechanism, a plan view of which is provided at the right hand portion of Fig. 1.

The drawings show that I have illustrated only one mechanism although preferably two of such mechanisms, one at each side of the car are necessary for the proper carrying out of the idea. I may also prefer to provide another pair of such mechanisms located in laterally spaced relation in order that the turning may be accomplished on the opposite portion of the wheel. However, for the purpose of describing and claiming my invention, I have conceived it necessary to illustrate only one of such mechanisms.

The device of my invention comprises a base or bed 10, which may be located at a convenient point alongside of a switch track, and securely mounted.

The part of the mechanism corresponding to the tail stock of a lathe consists of a bedplate 11 adapted to be clamped in a desired position by means of the bolts 12. Above this plate is a laterally guided plate 13, the movement of which is controlled by a screw, not shown, governed by an arm 14. Projecting above the plate 13 is a large threaded boss or post 15 and engaging this threaded member is the cylindrical depending portion 16 of the tail stock 20. The screw thread arrangement provides for vertical adjustment of the deadspindle 17 of the tail stock. This spindle is movable forward and backward by means of a screw, not shown, controlled by a handwheel 18. Bolts 19 at the two sides of the stock 20 which carries the spindle 17 and set bolt 21 serve to hold the stock in a fixed position and prevent rotation of the stock when set at the required elevation.

Prior to the engagement of the spindle 17 with the center provided in the exposed end of the journal 22, the weight of the car and truck is relieved from the journal by means of a jack indicated at 23 in Fig. 2, the jack being of conventional form and being actuated by means of a shaft 24 extending backwardly and having a square portion 25 adapted to be engaged by the crank, not shown. When the weight has been relieved and with the brasses 26 riding on top of the journal, the spindle 17 is adjusted to a position where its center is slightly above the center provided on the exposed end of the journal. Thereafter, by rotating the hand-wheel 18 the spindle is projected forwardly and forced into the tapered opening constituting the center of the axle. This serves to raise the wheel 27 above the track as shown in Fig. 2.

It will be understood that the described operations have been repeated on the opposite side of the truck; in other words, that the weight carried on the journal has been relieved as already described. Thus, by simultaneous action in projection the spindles forwardly, the wheels and axle are lifted sufficiently to free the tread from contact with the track.

Thereafter a sprocket 28, best shown in Figs. 1 and 2, is applied to the car axle. This sprocket is formed in two parts, each part being fixed to one half of a sleeve. The two parts 29, 30 of the sleeve are separable and are joined in operative position around the axle by means of the bolts 31. Set bolts 32, carried by the parts 29 and 30 of the sleeve are then projected into contact with the axle to prevent rotation between the sleeve and axle. A sprocket chain 33 connects the sprocket 28 to a small sprocket 34 fixed to a shaft 35 that is carried backward through suitable bearings 35a in Fig. 3, where it terminates in a connection 36 to a motor 37. The showing of the connection to the motor is conventional it being understood that suitable speed reducing means are to be employed. The bearing 35a for the shaft 35 are so arranged that the shaft is adapted to be retracted longitudinally to an extent that will bring it outside the limits of the car track and wheels.

At this point, the parts are in such position that the wheel and axle are adapted to be rotated on the spindle 17 and a corresponding spindle on the opposite side of the track. This insures rotation of the wheel on an exact center and provides for accurate re-facing of the tread by means of the mechanism about to be described.

In the drawings, I have shown the bed plate as adapted to receive two tool heads, one right-handed and the other, left-handed, but I have illustrated but one set of such mechanisms. It will be understood, however, that I contemplate the provision of the double mechanism in order to adapt the apparatus for operation on either side of the wheels if desired, in order to avoid obstructions such as brake beams and brake shoes.

The tool head illustrated in the right hand portion of Fig. 1 and more clearly in Fig. 3 consists of a head 38 mounted on a base that is guided on a longitudinal slide 39 and movable on said slide by a screw and handwheel 40. The slide 39 has a downwardly projecting stud 41 that enters a base member 42, whereby all the parts superposed thereon are rotatable and are held in adjustable angular position by means of bolts 43 which engage through ears 44 on the respective parts. This provision is made in order to accommodate the tool to angular positions corresponding to the inclined tread to be acted on.

The part 42 is laterally movable on suitable slides by means of the shaft 45 and handwheel 46. The parts described are carried on a base member 47 having guide flanges 48 which operate in suitable guides 49 on the base plate adapting the entire mechanism just described to be bodily retracted out of the plane of the car journal boxes.

Fixed to the tool head 38 is a bracket 50 which carries a finger 51 adapted to contact and ride on a master contour or contour guide 52 fixed to a slide 53 that is controlled by a bolt 54 engaging the base member 42. By means of this bolt the extent of cut of the tool is controlled, the contour guide being moved backward and forward as required.

The tool indicated at 55 in Fig. 1 is mounted in a tool holder 56 and held by means of a bolt 57. The tool holder has its shank 57 seated in the tool head and held by means of a key 58 and a set bolt 59. A tool will be utilized having a cutting edge that will adapt itself to the desired contour of the tread.

As a means for providing spring controlled feed for the laterally and longitudinal sliding adjustments, I utilize the mechanism shown in Fig. 1, identical for both adjustments, consisting of a drum 60 mounted on a stud shaft 61 and having a handle 62. The drum contains a coil spring 63 and has a toothed connection to the pinion 64. This pinion is adapted for sliding movement on its shaft into and out of engagement with the gears. When in the position shown in the drawings, the pinion engages a gear 65 on the shaft that is controlled by the hand-wheels 40, 46 respectively. A pawl and ratchet 60a are provided for temporarily holding the drum before and after feeding operation of the tool. By turning the drum and tensioning the coil spring and then sliding the pinion 64 forward into engagement with the gears and releasing the pawl, the spring controlled feed may be effected as permitted by the contour guide.

The operation is as follows:

Assuming that a car has been placed in substantially an exact position relative to the wheel-truing machine, the jack 23 is actuated to relieve the weight of the car and truck from the journal 22; this is done at both sides of the truck. The tail stocks 20 are then projected forwardly until the spindles 17 extend into the journal box, the cover having been raised. The exact vertical position of the spindle is determined by rotating the tail stock on the threaded boss. The spindle will be laterally positioned so that its point is in vertical alignment with the center; the elevation should be with the point slightly above the center of the axle. In this position the set bolts are actuated in order to securely clamp the tail stock in operative position. Thereafter the spindle is projected into the center, the wedging action of the point on the tapered recess serving to slightly elevate the wheels from the track. At this point the sprocket is applied to the axle, as indicated in Fig. 2 and the motor connected thereto in order that the wheels and axle may be rotated.

The wheels being now in position to be actuated, the cutting tool is placed in position by suitable adjustments of the tool head on the bed plate. A contour 52 is applied that will represent the desired finished contour of the tread and the parts started in motion. By utilizing high speed cutting tools the tread may be turned comparatively quickly. Preferably the tool head will be fed by hand until the tool reaches the throat of the flange, whereupon the guide finger will be engaged by the contour guide. Preferably, also, at that point, the spring feed of the forward travel will be put into operation, the lateral movement of the tool being controlled by the hand-wheel 46 connected to the lateral feeding mechanism. This insures that the forward movement will be controlled by the contour guide and the depth of cut regulated thereby. When the cutting tool arrives at the periphery of the wheel flange, the operation is reversed. The spring feed for the lateral control is actuated and the longitudinal movement is controlled by the handwheel 40. For a second cut the contour guide is moved inward by the bolt 54, the extent of movement controlling the depth of the cut.

After the predetermined contour has been reached, the tool head is retracted on its slideways together with the shaft 35. The sprocket wheel is disconnected, the spindle withdrawn and the tail stock retracted. The jack is then actuated to restore the weight of the car to the axle.

Grinding mechanism, not shown, may be substituted for or added to the turning mechanism if desired, the means for elevating and rotating the axle and wheels remaining the same.

By the described means the wheels of a car may be re-faced quickly and without the loss of time incident to removal and replacement of the wheels as commonly carried out.

I claim:

1. In a device for resurfacing car wheels without removing the wheels and axle from their operative positions beneath a car, the combination of means acting through the car journal box for relieving the weight of the car and truck from the journals, means for raising the car wheels and axle and centering the axle between supports, means cooperating with the axle for rotating the wheels, a cutting tool supported on a movable tool head, a guide stem mounted thereon, means for moving said cutting tool across the tread and flange of a wheel, and a flange contour guide, said guide cooperating with the guide stem on said movable tool head whereby the cutting tool is adapted to automatically follow the contour of the flange when crossing the same.

2. In a device for resurfacing car wheels without removing the wheels and axle from their operative positions beneath a car, the combination of means acting through the car journal box for relieving the weight of the car and truck from the journals, means for raising the car wheels and axle and centering the axle between supports, means cooperating with the axle for rotating the wheels, a cutting tool supported on a movable tool head, a guide stem mounted thereon, means for moving said cutting tool across the tread and flange of a wheel, a flange contour guide, said guide cooperating with the guide stem on said movable tool head, and means cooperating with said tool head and acting at right angles to the forward direction thereof whereby to feed said tool inward after it reaches the rim of the flange.

3. In a device for resurfacing car wheels without removing the wheels and axle from their operative positions beneath a car, the combination of means acting through the car journal box for relieving the weight of the car and truck from the journals, means for raising the car wheels and axle and centering the axle between supports, means cooperating with the axle for rotating the wheels, a cutting tool mounted on a tool head, said tool head being movable forwardly and transversely, means for moving said tool across said wheel tread in a predetermined path, and means cooperating with said tool head whereby said tool is adapted to automatically follow the flange contour when cutting the same.

4. In a device for resurfacing car wheels without removing the wheels and axle from their operative positions beneath a car, the combination of means acting through the car journal box for relieving the weight of the car and truck from the journals, means for raising the car wheels and axle and centering the axle between supports, means cooperating with the axle for rotating the wheels, a cutting tool mounted on a rotatably adjustable tool head, said tool head being movable forwardly and transversely, means for moving said tool across said wheel tread in a predetermined path, said path being obtained by adjusting said tool head, and means cooperating with said tool head whereby said tool is adapted to automatically follow the flange contour when cutting the same.

5. In a device for resurfacing car wheels without removing the wheels or axle from their operative position beneath a car and in which means are provided for raising the journal box, other means acting on the journal for raising the axle and wheels and centering the axle, the combination of means for rotating the free wheels and axles, a cutting tool mounted on a rotatable tool head, means for permitting forward and transverse movement of said tool head, means for advancing said tool in a predetermined path across the tread of the wheel, and means cooperating with the forward and transverse elements of said tool head whereby said tool is automatically carried in a path over said wheel flange corresponding to the contour thereof.

6. In a device for resurfacing car wheels without removing the wheels and axle from their operative position beneath a car, the combination of means acting through the car journal box for relieving the weight of the car and truck from the journals, means for raising the car wheels and axle and centering the axle between supports, a split gear adapted to be clamped to the axle, a motor for rotating the axle and wheels, a cutting tool, a movable tool head, and means cooperating with said tool head for progressively guiding said tool across said wheel tread.

In testimony whereof I have affixed my signature.

CHARLES P. KIMMEL.